United States Patent
Rauta et al.

(10) Patent No.: US 12,300,050 B2
(45) Date of Patent: May 13, 2025

(54) ACCESS CONTROL SOLUTION FOR A PASSAGE DEVICE

(71) Applicant: KONE Corporation, Helsinki (FI)

(72) Inventors: Visa Rauta, Helsinki (FI); Matti Unelius, Helsinki (FI)

(73) Assignee: KONE CORPORATION, Helsinki (FI)

( * ) Notice: Subject to any disclaimer, the term of this patent is extended or adjusted under 35 U.S.C. 154(b) by 189 days.

(21) Appl. No.: 17/497,510

(22) Filed: Oct. 8, 2021

(65) Prior Publication Data
US 2022/0028197 A1 Jan. 27, 2022

Related U.S. Application Data

(63) Continuation of application No. PCT/FI2019/050404, filed on May 24, 2019.

(51) Int. Cl.
| | |
|---|---|
| *G07C 9/00* | (2020.01) |
| *G06V 10/80* | (2022.01) |
| *G06V 20/52* | (2022.01) |
| *G06V 40/16* | (2022.01) |
| *G07C 9/15* | (2020.01) |

(52) U.S. Cl.
CPC ........ *G07C 9/00563* (2013.01); *G06V 10/811* (2022.01); *G06V 20/52* (2022.01); *G06V 40/168* (2022.01); *G06V 40/172* (2022.01); *G07C 9/15* (2020.01)

(58) Field of Classification Search
CPC .... G07C 9/00563; G07C 9/15; G06V 10/811; G06V 20/52
See application file for complete search history.

(56) References Cited

U.S. PATENT DOCUMENTS

| | | | |
|---|---|---|---|
| 2016/0295171 A1 | 10/2016 | Van Den Brink | |
| 2018/0182191 A1* | 6/2018 | Wagstaff | G06F 12/0804 |
| (Continued) | | | |

FOREIGN PATENT DOCUMENTS

| | | |
|---|---|---|
| CN | 105745922 A | 7/2016 |
| WO | WO 03/088157 A1 | 10/2003 |

OTHER PUBLICATIONS

International Search Report for PCT/FI2019/050404 mailed on Mar. 9, 2020.

(Continued)

*Primary Examiner* — Nabil H Syed
(74) *Attorney, Agent, or Firm* — Birch, Stewart, Kolasch & Birch, LLP

(57) ABSTRACT

An access control system for a passage device includes a first imaging device having a first field of view to an entrance area of the passage device for providing first image data, a second imaging device having a second field of view to the entrance area of the passage device for providing second image data, and a control unit for performing a facial recognition-based access control procedure for the first image data and/or for the second image data. The first imaging device is arranged to the passage device or in a vicinity of the passage device and the second imaging device is arranged to the passage device or in a vicinity of the passage device so that the second field of view differs at least partly from the first field of view. A method for access control of the passage device is also disclosed.

16 Claims, 5 Drawing Sheets

(56) References Cited

U.S. PATENT DOCUMENTS

| | | | | |
|---|---|---|---|---|
| 2018/0365550 A1* | 12/2018 | Brown | ............ | G01V 8/20 |
| 2019/0057561 A1* | 2/2019 | Zavesky | ............ | G07C 9/00563 |
| 2019/0147676 A1* | 5/2019 | Madzhunkov | ......... | H04N 23/10 |
| | | | | 340/5.2 |
| 2019/0272691 A1* | 9/2019 | Nye | ............ | G07C 9/38 |
| 2019/0338560 A1* | 11/2019 | Ali | ............ | E05B 45/06 |
| 2019/0355193 A1* | 11/2019 | Kirsch | ............ | G06V 20/52 |
| 2020/0293756 A1* | 9/2020 | Ainsworth | ............ | G06V 40/161 |
| 2020/0320282 A1* | 10/2020 | Boic | ............ | G06V 40/45 |
| 2021/0209877 A1* | 7/2021 | Neill | ............ | G06V 40/172 |

OTHER PUBLICATIONS

Written Opinion of the International Searching Authority for PCT/FI2019/050404 mailed on Mar. 9, 2020.

* cited by examiner

ACCESS CONTROL SOLUTION FOR A PASSAGE DEVICE

CROSS REFERENCE TO RELATED APPLICATION

This application is a Continuation of PCT International Application No. PCT/FI2019/050404, filed on May 24, 2019, which is hereby expressly incorporated by reference into the present application.

TECHNICAL FIELD

The invention concerns in general the technical field of access control. Especially the invention concerns access control for a passage device.

BACKGROUND

Typically, passage devices, such as security gates, elevator door frames, automatic doors, and turnstiles, comprises access control. The access control enables that only authorized users may have access through the passage device. The access control may be based on using keycards; tags; identification codes; such as personal identity number (PIN) code, ID number; and/or biometric technologies, such as fingerprint, facial recognition, iris recognition, retinal scan, voice recognition, etc.

The reliability of the access control of the passage devices typically suffers from unwanted tailgating and/or multi user access. In the tailgating, a user without authorization to access the passage device passes through the passage device after an authorized user with one access. In the multi user access, one or more users without authorization pass through the passage device in the wake of an authorized user with one access.

Thus, there is need to develop further solutions in order to improve the reliability of access control of the passage devices.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an access control system and method for access control of a passage device. Another objective of the invention is that the access control system and method for access control of a passage device improves efficiency of prevention of tailgating.

The objectives of the invention are reached by a method, an apparatus and a computer program as defined by the respective independent claims.

According to a first aspect, an access control system for a passage device is provided, wherein the system comprises: a first imaging device having a first field of view to an entrance area of the passage device for providing first image data, a second imaging device having a second field of view to the entrance area of the passage device for providing second image data, and a control unit for performing facial recognition-based an access control procedure for the first image data and/or for the second image data, wherein the first imaging device is arranged to the passage device or in a vicinity of the passage device and the second imaging device is arranged to the passage device or in a vicinity of the passage device so that the second field of view differs at least partly from the first field of view.

The passage device may be one of the following: security gate, elevator door, automatic door, building door, turnstile.

The first imaging device may be arranged to a frame of the passage device, inside the passage device, or next to the passage device.

Alternatively, the first imaging device may be arranged to a first frame of the passage device and the second imaging device may arrange to a second frame of the passage device.

The first imaging device may be communicatively coupled to the control unit, wherein the communicatively coupling may be based on one of the following technologies: wired, wireless.

Alternatively or in addition, the second imaging device may be communicatively coupled to the control unit, wherein the communicatively coupling may be based on one of the following technologies: wired, wireless.

The first imaging device may be one of the following: camera, video camera, and the second imaging device may be one of the following: camera, video camera.

The control unit may further be configured to: detect at least one object within the first field of view and/or within the second field of view, perform the facial recognition-based access control procedure for the first image data in case the at least one object is detected within the first field of view and/or for the second image data in case the at least one object is detected within the second field of view, and generate an access control action based on at least one recognition result, wherein the access control action comprises an access denied indication, if at least one recognition result indicates access denied, otherwise the access control action comprises an access granted indication.

The access denied indication may comprise: visual indication, voice indication, closing a barrier device of the passage device, and/or sending the image data causing the recognition result indicating access denied to an external security entity.

Alternatively or in addition, the access granted indication may comprise: visual indication, voice indication, and/or opening a barrier device of the passage device.

The facial recognition-based access control procedure may comprise: generating at least one facial feature from the image data; comparing the generated at least one facial feature to a plurality of stored facial images; and generating a recognition result indicating access granted, in response to the at least one facial feature matches with one of the stored plurality of facial images; or generating a recognition result indicating access denied, in response to the at least one facial feature does not match to any of the stored plurality of facial images.

According to a second aspect, a method for access control of a passage device is provided, wherein the method comprises: obtaining a first image data from a first imaging device having a first field of view to an entrance area of the passage device, and/or obtaining a second image data from a second imaging device having a second field of view to the entrance area of the passage device, wherein the first imaging device is arranged to the passage device or in a vicinity of the passage device and the second imaging device is arranged to the passage device or in a vicinity of the passage device so that the second field of view differs at least partly from the first field of view.

The passage device may be one of the following: security gate, elevator door, automatic door frame, building door, turnstile.

The first imaging device may be arranged to a frame of the passage device, inside the passage device, or next to the passage device.

Alternatively, the first imaging device may be arranged to a first frame of the passage device and the second imaging device is arrange to a second frame of the passage device.

The first imaging device may be communicatively coupled to the control unit, wherein the communicatively coupling may be based on one of the following technologies: wired, wireless.

Alternatively or in addition, the second imaging device may be communicatively coupled to the control unit, wherein the communicatively coupling may be based on one of the following technologies: wired, wireless.

The first imaging device may be one of the following: camera, video camera, and the second imaging device is one of the following: camera, video camera.

The method may further comprise: detecting at least one object within the first field of view and/or within the second field of view, performing the facial recognition-based access control procedure for the first image data in case the at least one object is detected within the first field of view or for the second image data in case the at least one object is detected within the second field of view, and generating an access control action based on at least one recognition result, wherein the access control action comprises an access denied indication, if at least one recognition result indicates access denied, otherwise the access control action comprises an access granted indication.

The access denied indication may comprise: visual indication, voice indication, closing a barrier device of the passage device, and/or sending the image data causing the recognition result indicating access denied to an external security entity.

Alternatively or in addition, the access granted indication may comprise: visual indication, voice indication, and/or opening a barrier device of the passage device.

the facial recognition-based access control procedure may comprise: generating at least one facial feature from the image data; comparing the generated at least one facial feature to a plurality of stored facial images; and generating a recognition result indicating access granted, in response to the at least one facial feature matches with one of the stored plurality of facial images; or generating a recognition result indicating access denied, in response to the at least one facial feature does not match with the stored plurality of facial images.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
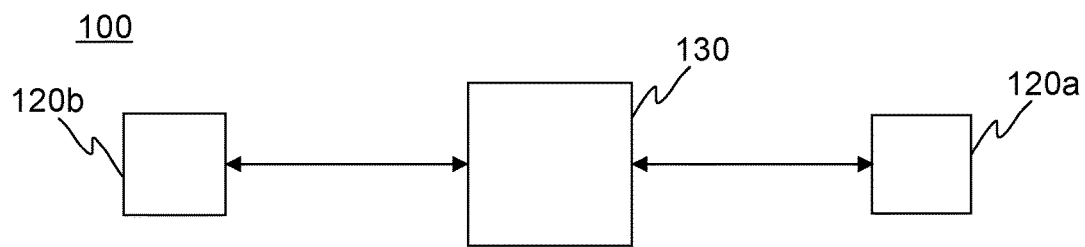
FIG. 1A illustrates schematically an example of an access control system for a passage device according to the invention.

FIG. 1A illustrates schematically an example of an access control system 100 for a passage device 110 according to the invention. The access control system 100 comprises a first imaging device 120a, a second imaging 120b, and a control unit 130. The first imaging device 120a may a camera or a video camera. The second imaging device 120b may be a camera or video camera. The first imaging device 120a may be communicatively coupled, i.e. connected, to the control unit 130. The communicatively coupling between the first imaging device 120a may be based on any known wired or wireless technologies. Alternatively or in addition, the second imaging device 120b may be communicatively coupled, i.e. connected, to the control unit 130. The communicatively coupling between the second imaging device 120b may be based on any known wired or wireless technologies.

Figure 1B:
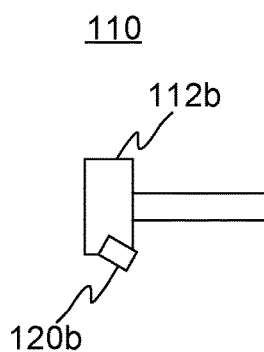
FIGS. 1B and 1C illustrate an example of a passage device to which an access control system according to the invention may be implemented.
Figure 1C:
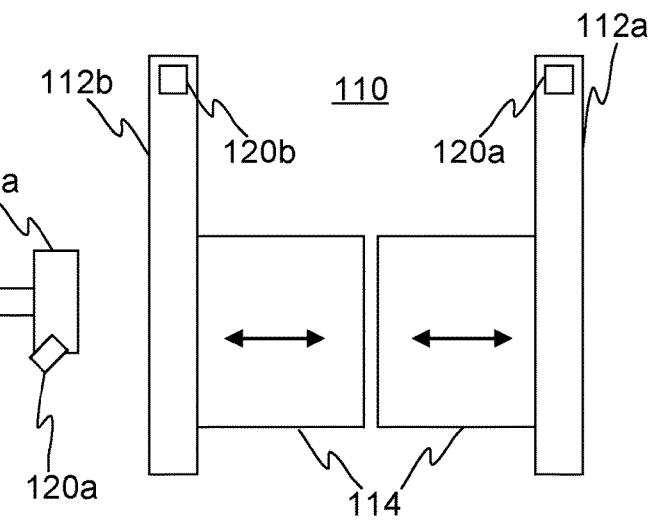

FIGS. 1B and 1C illustrates an example of the passage device 110 to which the access control system 100 according to the invention may be implemented. FIG. 1B illustrates the passage device 110 from above and the FIG. 1C illustrates a front view of the passage device 110. The passage device 110 may be one of the following: security gate, elevator door, automatic door, building door, turnstile or any other passage way. The passage device 110 comprises a frame structure. Furthermore, the passage device 110 may comprise a barrier device 114, e.g. door panel(s), gate, boom or any other barrier device, for preventing unauthorized access through the passage device 110. The example passage device 110 of FIGS. 1B and 1C is a security gate comprising door panels as a barrier device 114. The door panels, i.e. the barrier device 114 is in a closed state in FIGS. 1B and 1C. The barrier device 114 of the passage device may be initially closed, i.e. the barrier device 114 is maintained closed and opened to provide access through the passage device 110. Alternatively, the barrier device of the passage device 110 may be initially open, i.e. the barrier device 114 is maintained open and closed to prevent access through the passage device 110. The frame structure of the passage device 110 may comprise a first vertical frame 112a and a second vertical frame 112b. The barrier device 114 may be arranged between the first vertical frame 112a and the second vertical frame 112b to prevent unauthorized access between the first vertical frame 112a and the second vertical frame 112b. The frame structure of the passage device 110 may further comprise a first horizontal frame and/or a second horizontal frame arranged between the first and second vertical frames 112a, 112b at the end of the first and second vertical frames 112a, 112b. The wirings of the first imaging device 120a and/or second imaging device 120b may be arranged to travel inside one or more frames of the passage device 110 to enable easy and neat installation of the wirings.

The access control system 100 may be provided to the passage device 110 to control one-way access through the passage device 110. The control unit 130 is configured to monitor passage of one or more users through the passage device 110 by performing facial recognition-based an access control procedure in order to detect unauthorized users passing through the passage device 110 and/or preventing the access of unauthorized users through the passage device 110. The passage device 110 may comprise a separate control unit to control the operation, e.g. opening or closing, of barrier device 114 of the passage device 110. For example, the elevator door and/or automatic door may comprise a door control unit for controlling the operation of the door. The separate door control unit of the passage device 110 may be controlled by the control unit 130, e.g. by generating at least one control signal. Alternatively, the control unit 130 may control the operation, e.g. opening or closing, of the barrier device 114 of the passage device 110. The access control is based on facial recognition-based an access control that will be described later in this application. The access control system and method according to the invention may utilize machine vision in the access control.

Figure 2A:
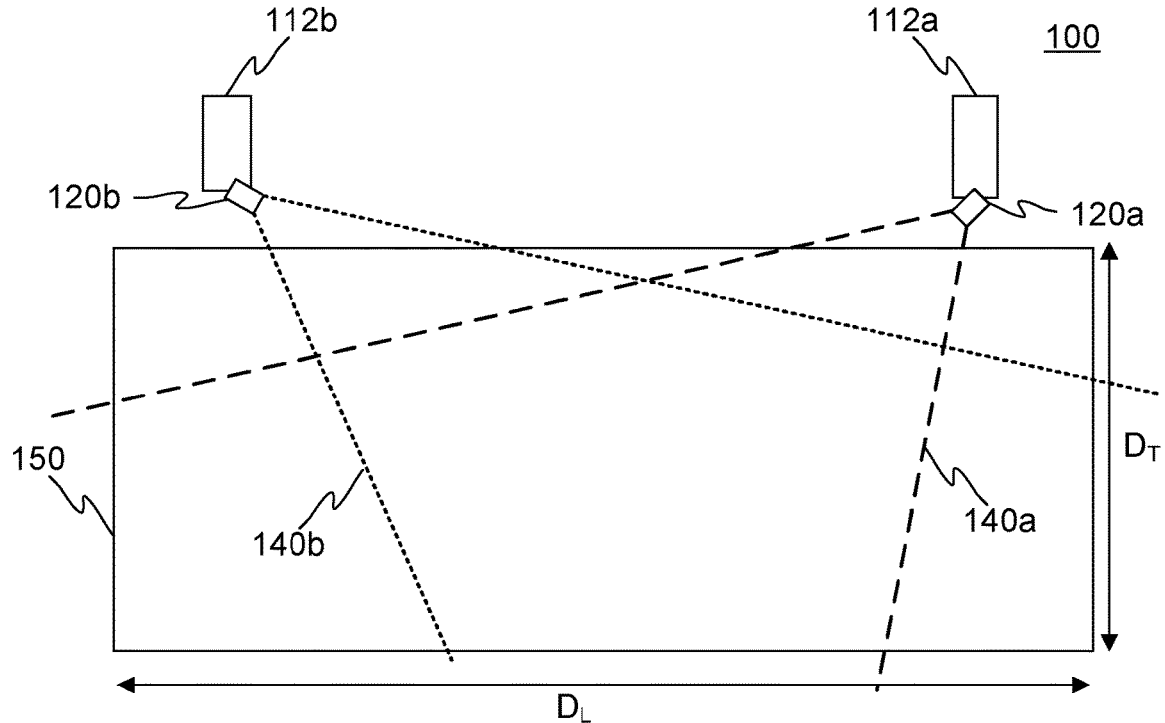
FIGS. 2A and 2B illustrate schematically another example of an access control system for a passage device according to the invention.

The first imaging device 120a has a first field of view 140a to an entrance area 150 of the passage device 110. The second imaging device 120b has a second field of view 140b to the entrance area 150 of the passage device 110. The second field of view 140b is configured to differ at least partly from the first field of view 140a. The field of view (FOV) is a solid angle through which an image sensor of the imaging device 120a, 120b is sensitive to electromagnetic radiation, i.e. the angle though which the imaging device 120a, 120b may obtain electromagnetic radiation. The field of view 140a, 140b of the imaging device 120a, 120b may be defined at least by a focal length and the image sensor of the imaging device 120a, 120b. FIG. 2A illustrates one non-limiting example of the first field of view 140a and the second field of view 140b. In the example of FIG. 2A the passage device 110 is shown from the above. The example passage device 110 is a security gate without a barrier device 114 in this example. The entrance area 150 may be an imaginary area residing in front of the passage device 110 at the side of the passage device 110 from which the access through the passage device 110 is controlled. An object, e.g. a person, intending to pass through the passage device 110 passes though the entrance area 150 in order to be able to pass through the passage device 100. The entrance area 150 may extends at least in longitudinal direction, i.e. horizontal direction, $D_L$ from a first end, e.g. a first frame 112a, of the passage device 110 to a second end, e.g. a second frame 112b, of the passage device 110. In the transverse direction $D_T$, i.e. direction perpendicular to the longitudinal direction $D_L$, the entrance area may extent from the passage device 110 to a predefined distance, e.g. from 0.5 meters to 10 meters. The first field of view 140a and the second field of view 140b may preferably be directed so that the majority of the entrance area 150 of the passage device 110 may be covered by the first field of view 140a and the second field of view 140b, but at the same time the first field of view 140a and the second field of view 140b may not cover too wide area in order to reduce unnecessary facial recognition-based access control procedures for objects not intending to pass through the passage device 110.

The first imaging device 120a is configured to provide first image data of the first field of view 140a. The second imaging device 120b is configured to provide second image data of the second field of view 140b. The first imaging device 120a is arranged to the passage device 110, e.g. to a frame of the passage device 110 or inside the passage device 110; or in a vicinity of the passage device 110, e.g. to a wall, ceiling or a separate support structure at a such distance from the passage device 110 that the facial recognition may be performed. The frame of the passage device 110 to which the first imaging device 120a may be arranged may be one of the vertical frames 112a, 112b or the horizontal frame arranged at the top end of the vertical frames 112a, 112b between the vertical frames 112a, 112b. The second imaging device 120b is arranged to the passage device 110, e.g. to a frame of the passage device 110 or inside the passage device 110; or in a vicinity of the passage device 110, e.g. to a wall, ceiling or a separate support structure at a such distance from the passage device 110 that the facial recognition may be performed, so that the second field of view 140b differs at least partly from the first field of view 140a, i.e. the first field of view 140a and the second field of view 140b may overlap partly. The frame of the passage device 110 to which the second imaging device 120b may be arranged may be one of the vertical frames 112a, 112b or the horizontal frame arranged at the top end of the vertical frames 112a, 112b between the vertical frames 112a, 112b. With the term a vicinity of the passage device 110 is meant throughout this application an environment surrounding the passage device 110 at a such distance from the passage device 110 that the facial recognition may be performed. When the imaging device 120a, 120b is arranged in the vicinity of the passage device 110, the imaging device 120a, 120b is apart, i.e. separate entity, from the passage device 110. The imaging device 120a, 120b may be arranged to the passage device 110 by mounting the imaging device 120a, 120b to a frame of the passage device 110 by means of any known mounting means, e.g. bracket, nuts and bolts, etc., and/or by integrating the imaging device 120a, 120b into a frame or a barrier device 114 of the passage device 110, e.g. into a door panel. According to an example embodiment, the second field of view 140b may differ fully from the first field of view 140a, i.e. the first field of view 140a and the second field of view 140b do not overlap at least within the entrance area 150. The first imaging device 120a and the second imaging device 120b may be arranged at a height in a vertical direction that the first imaging device 120a and the second imaging device 120b are capable to provide, e.g. capture, image data comprising face of the object, e.g. a person. The first imaging device 120a may provide continuously the first image data and/or the second imaging device 120b may provide continuously the second image data. Alternatively, the access control system 100 according to the invention may comprise at least one detector, e.g. a motion detector, or a proximity detector, for detecting at least one object approaching to the passage device 110, e.g. within the entrance area 150 of the passage device 110. In response to detecting the at least one object, the first imaging device 120a may be configured to provide the first image data and/or the second imaging device 120b may be configured to provide the second image data.

According to an example embodiment of the invention, the first imaging device 120a may be arranged to a first frame 112a of the passage device 110 and the second imaging device 120b may be arranged to a second frame 112b of the passage device 110 as illustrated in the example of FIG. 2A. This enables easy and simple wired coupling of the first imaging device 120b and the second imaging device 120b to the passage device 110 and/or to the control unit 130 if the control unit 110 is arranged to the passage device 110. But the invention is not limited to that and the first imaging device 120a and/or second imaging device 120b may be wirelessly connected to the passage device 110 and/or to the control unit 130.

Figure 2B:
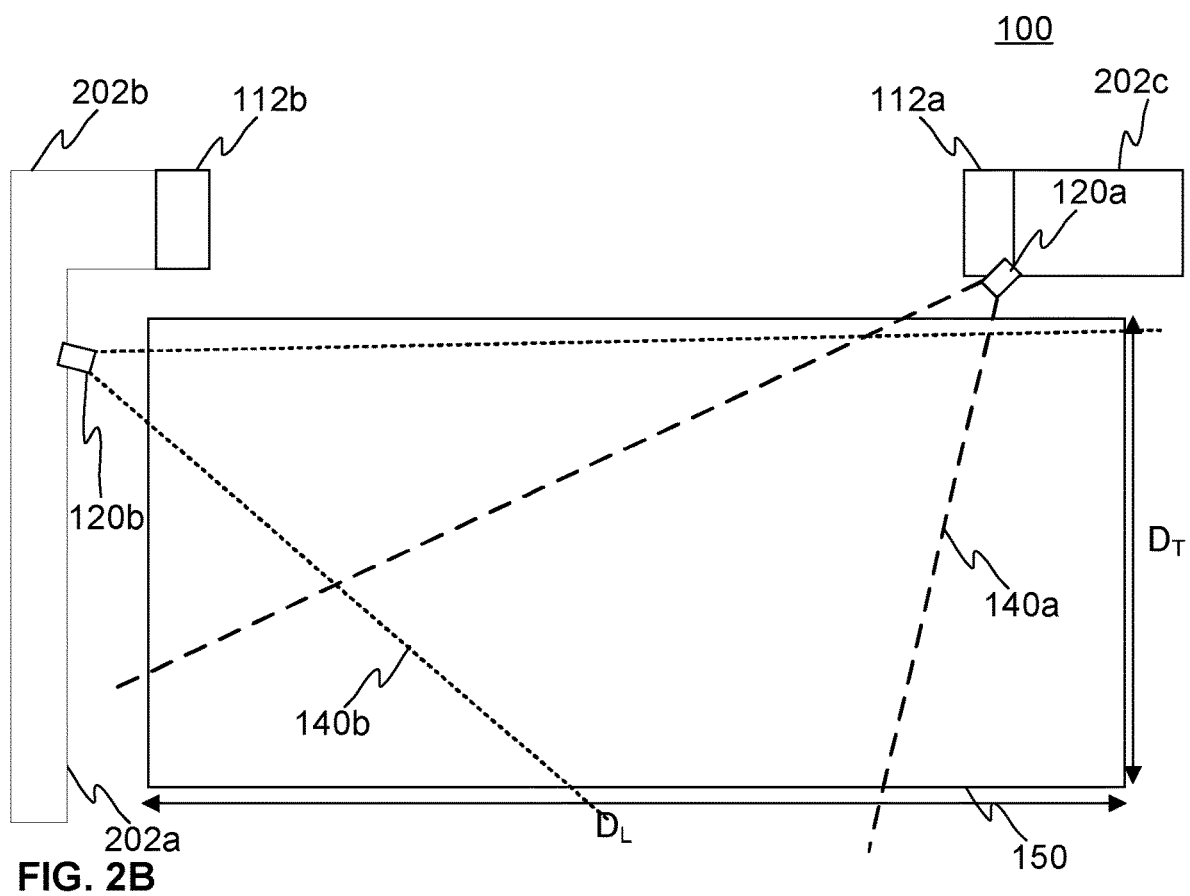

FIG. 2B illustrates schematically an example embodiment of the access control system 100 according to the invention, wherein the first imaging device 120a is arranged to the passage device 110, e.g. to the first frame 112a of the passage device 110 in this example, and the second imaging device 120b is arranged in the vicinity of the passage device 110, e.g. to a wall 202b in the vicinity of the passage device 110 in this example. For sake of clarity the control unit 130 is not illustrated in FIGS. 2A and 2B. Alternatively, the first imaging device 120a may be arranged in the vicinity of the passage device 110, e.g. to a wall 202c in the vicinity of the passage device 110, and the second imaging device 120b may be arranged to the passage device 110. Alternatively, the first imaging device 120a and the second imaging device 120b may both be arranged in the vicinity of the passage device 110, e.g. the first imaging device may be arranged to a wall 202c in the vicinity of the passage device 110, and the second imaging device 120b may be arranged to a wall 202a in the vicinity of the passage device 110. In the example of FIG. 2B the passage device 110 is shown from the above. The example passage device 110 is a security gate without a barrier device 114 in this example. In the example of FIG. 2B, the second imaging device 120b is arranged to the wall 202a that is perpendicular to the passage device 110, but alternatively the second imaging device 120b may be arranged to the wall 202b that is parallel with the passage device 110. If the second imaging device 120b is arranged to elsewhere than to the passage device 110 itself, the wireless connection to the control unit 130 and/or to the passage device 110 is preferable, but the invention is not limited to that and wired connection is also possible.

According to an example embodiment of the invention, the first imaging device 120a and the second imaging device 120b may be configured to provide the first image data and the second image data for the facial recognition-based access control procedure from different distances from the passage device 110. For example, the first imaging device 120a may be configured to provide the first image data from a first distance from the passage device 110 and the second imaging device 120b may be configured to provide the second image data from a second distance from the passage device 110, wherein the first distance and the second distance differs from each other.

According to one example embodiment of the invention, the control unit 130 may be configured to detect at least one object within the first field of view 140a and/or within the second field of view 140b. The detection may be performed from the obtained first image data or from the obtained second image data. In response to detection of the at least one object within the first field of view 140a and/or within the second field of view 140b, the control unit 130 may be configured to perform the facial recognition-based access control procedure for the first image data obtained from the first imaging device 120a in case the at least one object is detected within the first field of view 140a and/or for the second image data obtained from the second imaging device 120b in case the at least one object is detected within the second field of view 140b. The facial recognition-based access control procedure will be described later in this application. The control unit 130 is configured to generate an access control action based on at least one recognition result of the facial recognition-based access control procedure. The access control action may comprise an access denied indication, if at least one recognition result indicates access denied, otherwise the access control action may comprise an access granted indication. The access denied indication may comprise visual indication, voice indication, closing the barrier device 114 of the passage device 110, and/or sending the image data causing the recognition result indicating access denied to an external security entity. If the barrier device 114 of the passage device 110 is initially open, the access denied indication may comprise closing the barrier device 114 of the passage device 110. Alternatively, if the barrier device 114 of the passage device 110 is initially closed, the access denied indication may comprise maintaining the barrier device 114 of the passage device 110 closed. The access granted indication may comprise visual indication, voice indication, and/or opening the barrier device 114 of the passage device 110. If the barrier device 114 of the passage device 110 is initially closed, the access granted indication may comprise opening the barrier device 114 of the passage device 110. Alternatively, if the barrier device 114 of the passage device 110 is initially open, the access granted indication may comprise maintaining the barrier device 114 of the passage device 110. If the passage device 110 does not have the barrier device 140 access control action comprising visual indications and/or voice indications may be generated. Alternatively or in addition, if the passage device 110 does not have the barrier device 140 the access denied indication may further comprise sending the image data causing the recognition result indicating access denied to the external security entity, such as a remote server, a cloud server, a computing circuit, a network of computing devices. This enables that the unauthorized person may be identified, even though the unauthorized person passed through the passage device 110.

The visual indication and the voice indication may be provided via a user interface of the passage device 110. The user interface of the passage device 110 may comprise one or more light devices, e.g. Light-Emitting Diodes (LEDs) and/or one or more displays for providing the visual indication, e.g. an alarm light and/or an alarm symbol on the display and/or projected on a floor in front of the passage device 110. Alternatively or in addition, the user interface of the passage device 110 may comprise one or more loudspeakers for providing the voice indication, e.g. an alarm sound. According to an example the visual access denied indication may comprise switching on one or more LEDs arranged to the passage device 110, e.g. along the first vertical frame 112a and/or the second vertical frame, emitting a first color, e.g. red, indicating access denied. According to an example the visual access granted indication may comprise switching on one or more LEDs arranged to the passage device 110, e.g. along the first vertical frame 112a and/or the second vertical frame, emitting a second color, e.g. green of white, indicating access denied.

Figure 3:
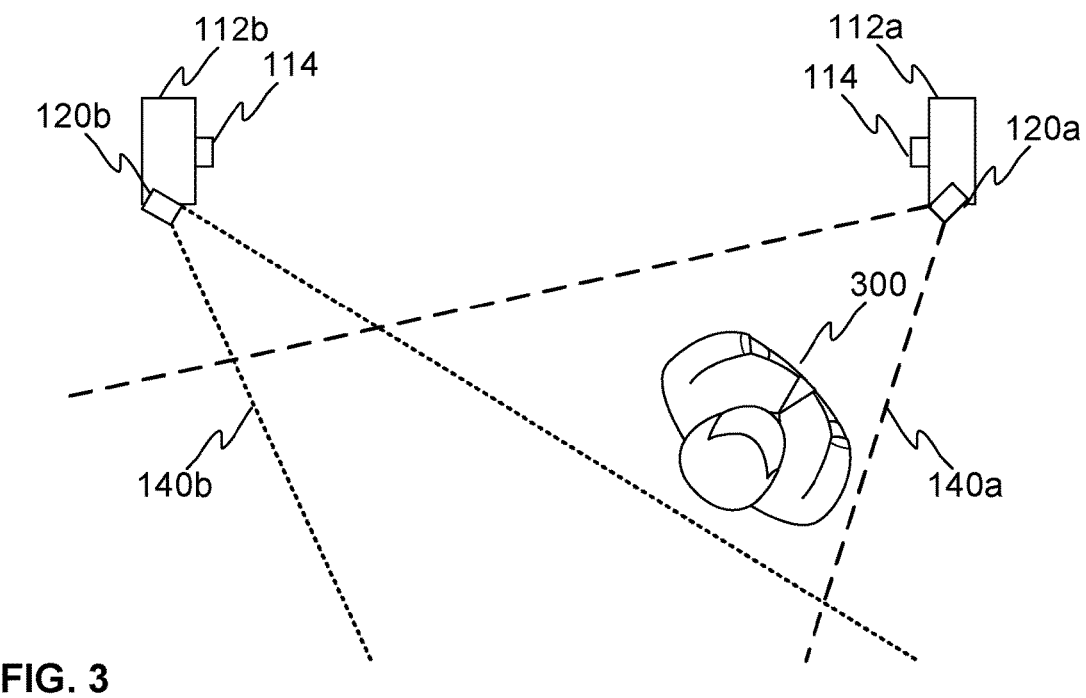
FIG. 3 illustrates schematically an example access control situation of an access control system according to the invention.

FIG. 3 illustrates schematically an example access control situation, wherein an object 300, i.e. a person, is detected within the first field of view 140*a*, but not within the second field of view 140*b*. For sake of clarity the control unit 130 and the entrance area 150 are not illustrated in FIG. 3. In this example, the barrier device 114 of the passage device is initially open, i.e. the barrier device 114 is maintained open until an access denied indication comprising closing the barrier device 114 of the passage device 110 is generated. If at least one recognition result of the facial recognition-based access control procedure indicates access granted, i.e. the person 300 has an authorization to access the passage device 110, the control unit 130 may be configured to generate the access control action comprising an access granted indication, e.g. visual indication and/or voice indication. As the barrier device 114 of the passage device 110 is initially open, the barrier device 114 is maintained open in response to the access granted indication. Alternatively, If at least one recognition result of the facial recognition-based access control procedure indicates access denied, i.e. the person 300 does not have an authorization to access the passage device 110, the control unit 130 may be configured to generate the access control action comprising an access denied indication comprising visual indication, voice indication, closing the barrier device 114 of the passage device 110, and/or sending the image data causing the recognition result indicating access denied to the external security entity.

Figure 4A:
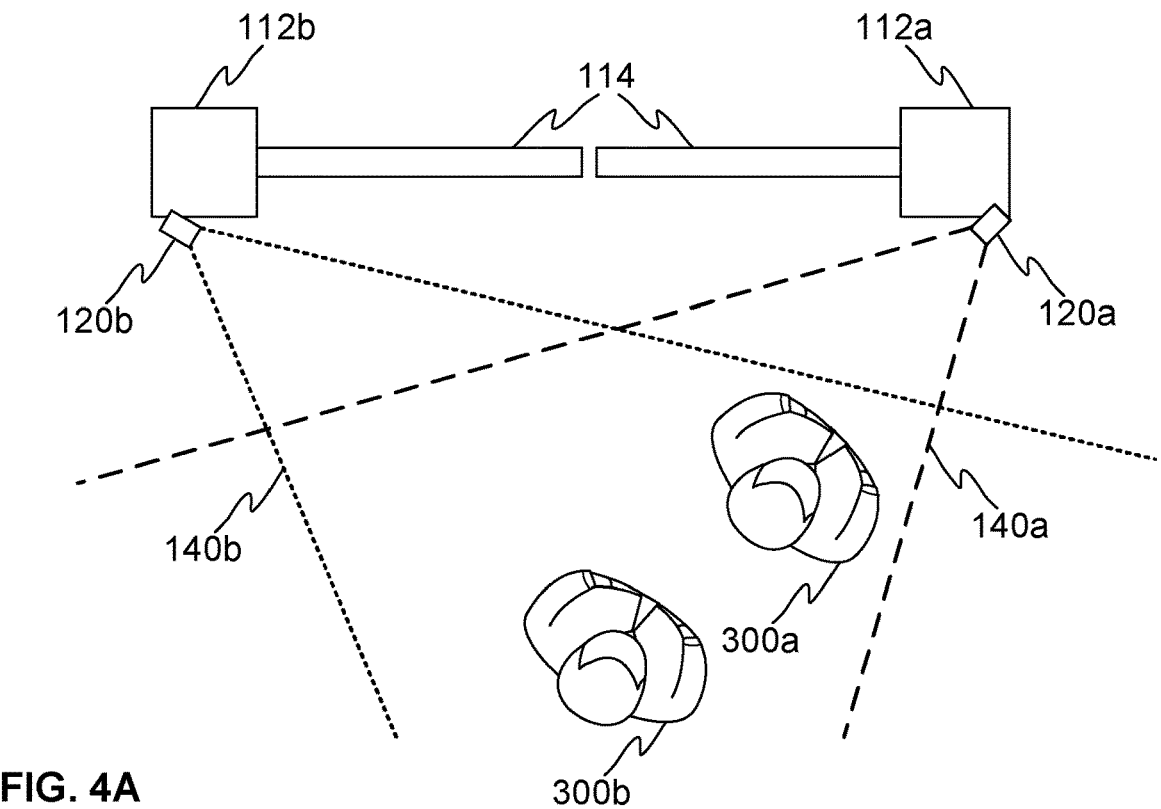
FIG. 4A illustrates schematically another example access control situation of an access control system according to the invention.

FIG. 4A illustrates an example access control situation, wherein a first object, i.e. a first person, 300*a* is detected within the first field of view 140*a* and/or within the second field of view 140*b*, and a second object, i.e. a second person, 300*b* is detected only within the second field of view 140*b*. In the example access control situation of FIG. 4A the second object 300*b* is behind the first object 300*a* so that the second object 300*b* cannot be detected within the first field of view 140*a* and is not shown in the first image data obtained by the first imaging device 120*a*. In this example, the barrier device 114 of the passage device 110 is initially closed, i.e. the barrier device 114 is maintained closed until an access granted indication comprising opening the barrier device 114 of the passage device 110 is generated. If the first person 300*a* and the second person 300*b* both have authorizations to access the passage device 110, the recognition results of the facial recognition-based access control procedure of the first image data and the second image data indicates access granted and thus the control unit 130 may be configured to generate the access control action comprising an access granted indication, e.g. visual indication and/or voice indication and opening the passage device, to allow both the first person 300*a* and the second person 300*b* to pass through the passage device 110. But for example, if the person 300*a* has an authorization to access the passage device 110 and the person 300*b* does not have an authorization to access the passage device 110, i.e. the second person 300*b* is trying to utilize tailgating to pass through the passage device 110 after the authorized first person 300*a*, the recognition result of the facial recognition-based access control procedure of the first image data indicates access granted, but the recognition result of the facial recognition-based access control procedure of the second image data indicates access denied. Thus, the control unit 130 may be configured to generate the access control action comprising an access denied indication comprising visual indication, voice indication, and/or sending the image data causing the recognition result indicating access denied to the external security entity. As the barrier device 114 of the passage device 110 is initially close, the barrier device 114 is maintained closed in response to the access denied indication in order to prevent the access of the unauthorized second person 300*b* and also the authorized first person 300*a*. If the barrier device 114 of the passage device 110 would be initially closed, the access denied indication may comprise closing the barrier device 114 of the passage device 110 in order to prevent the access of the unauthorized second person 300*b* and also the authorized first person 300*a*. The access control system 100 according to the invention comprising two imaging devices 120*a*, 120*b* having at least partly differing field of views 120*a*, 120*b* enables more efficient prevention of tailgating. If only the first imaging device 120*b* would be used, the tailgating as shown in the example access control situation of FIG. 4A could not be prevented, because the unauthorized second person would not be detected with the first imaging device 120*a*.

Figure 4B:
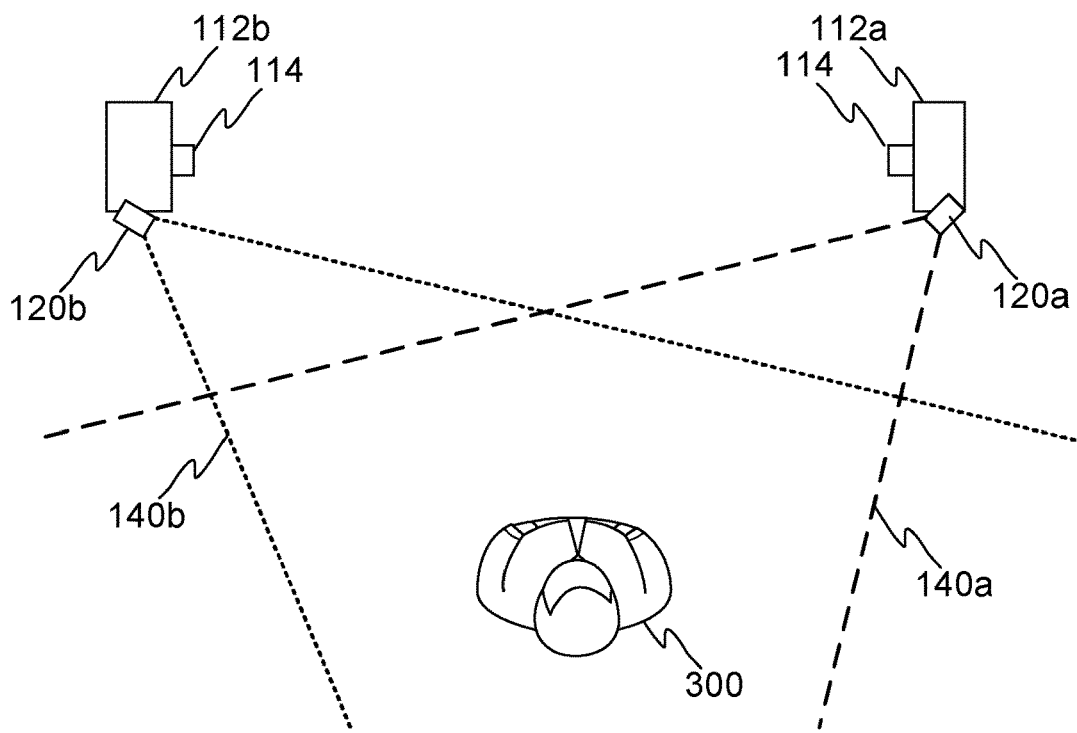
FIG. 4B illustrates schematically another example access control situation of an access control system according to the invention.

FIG. 4B illustrates another example access control situation, wherein an object, i.e. a person, 400 is detected within the first field of view 140*a* and within the second field of view 140*b*, i.e. the same object 300 is detected within the both field of views. In this example, the barrier device 114 of the passage device is initially open, i.e. the barrier device 114 is maintained open until an access denied indication comprising closing the barrier device 114 of the passage device 110 is generated. If the person 300 has an authorization to access the passage device 110, the recognition results of the facial recognition-based access control procedure of the first image data and the second image data indicate both access granted. Thus, the control unit 130 may be configured to generate the access control action comprising an access granted indication, e.g. visual indication and/or voice indication. As the barrier device 114 of the passage device is initially open, the barrier device 114 is maintained open in response to access granted indication to allow the person 300 to pass the passage device 110. Alternatively, if the person 300 does not have an authorization to access the passage device 110, the recognition results of the facial recognition-based access control procedure of the first image data and the second image data indicate both access denied. Thus, the control unit 130 may be configured to generate the access control action comprising an access denied indication comprising visual indication, voice indication, and/or sending the image data causing the recognition result indicating access denied to the external security entity; and closing the barrier device 114 of the passage device 110 in order to prevent the access of the unauthorized person 300. Thus, the access control system 100 according to the invention comprising two imaging devices 120*a*, 120*b* having at least partly differing field of views 120*a*, 120*b* improves at least partly the reliability of the facial recognition-based access control. Alternatively or in addition, the second imaging device 120*b* may be used to verify the facial recognition-based access control performed with the first imaging device 120*b*. In the example access control situation of FIG. 4B, wherein the same object 300 is detected within the first field of view 140*a* and within the second field of view 140*b*, if the recognition results of the facial recognition-based access control procedure of the first image data and the second image data contradict with each other, i.e. one of the recognition results indicates access granted and the other one of the recognition results indicates access denied, the access control action comprising an access denied indication may be generated. The contradicting recognition results may indicate a defect in the facial recognition-based access control procedure, in one of the imaging devices 120*a*, 120*b*, and/or in the obtained image data.

The facial recognition-based access control procedure used in different embodiments of the invention may be based on any known facial recognition-based access control procedures, e.g. traditional algorithm-based 2D recognition, 3D recognition, skin texture analysis, or a combination of one or more of these procedures. The facial recognition-based access control procedure for the first image data and for the second image data may be based on the same facial recognition-based access control procedures. Alternatively, the facial recognition-based access control procedure for the first image data and for the second image data may be based on different facial recognition-based access control procedures. The facial recognition-based access control procedure may comprise at least the following steps: face detection, feature extraction, and/or identification. The facial recognition-based access control procedure may be performed for each obtained image data to identify one or more objects, i.e. persons, from the obtained image data and to verify whether the one or more persons have authorization to access the passage device. The obtained image data may comprise a captured image from a still image or a video image. Next a simple example of some basic steps of the facial recognition-based access control procedure are described. First at the face detection step from the obtained image data a face of each at least one object, i.e. a person, may be extracted. The face of the each at least one object may be straight towards the imaging device 120a, 120b or the side profile of the face of the each at least one object may be towards the imaging device 120a, 120b, or anything between these. Next at the feature extraction stage at least one facial feature of each at least one object may be generated. The at least one facial feature may comprise, e.g. relative position, size and/or shape of the eyes, nose, cheekbones, forehead and/or chin; and/or distance between any of these, etc. The generated facial features may be used to distinguish the face of the object from the faces of other objects. At the identification step the generated at least one facial feature of each at least one object may be compared to a plurality of stored facial images. The facial images may be stored into a database. The database may be stored into a memory unit the control unit 130 or it may be an external database. Each of the stored plurality of facial images may represent a person having an authorization to access the passage device 110. In response to that the generated at least one facial feature of each at least one object matches with one of the stored plurality of facial images, a recognition result indicating access granted may be generated. Alternatively, in response to that the generated at least one facial feature of at least one of the at least one object does not match with any of the stored plurality of facial images, i.e. the generated at least one facial feature of at least one of the at least one object mismatches with the stored plurality of facial images, a recognition result indicating access denied may be generated. The generated at least one facial feature of an object may be defined to match with a stored facial image, if corresponding at least one facial feature of the object may be found from the stored facial image. The generated at least one facial feature of an object may be defined to mismatch with a stored facial image, if at least one of the at least one facial feature of the object is not found from the stored facial image.

The control unit 130 may be configured to perform the facial recognition-based access control procedure by itself, the control unit 130 may be configured to indirectly perform the facial recognition-based access control procedure by providing the obtained image data to an external computing unit which performs the facial recognition-based access control procedure steps, or the control unit 130 may be configured to perform the facial recognition-based access control procedure together with an external computing unit.

According to an example embodiment of the invention, a full facial recognition-based access control procedure e.g. according to the above described basic steps of the facial recognition-based access control procedure, may be performed for the first image data obtained from the first imaging device 120a to identify one or more objects, i.e. persons, from the obtained first image data and to verify whether the one or more persons have authorization to access the passage device. A simplified facial recognition-based access control procedure may be performed for the second image data obtained from the second imaging device 120b. The simplified facial recognition-based access control procedure may for example comprise only the face detection step to extract one or more human objects from the second image data. In response to not detecting one or more human objects from the second image data, a recognition result indicating access granted may be generated. Alternatively, in response to a detection of one or more human objects from the second image data, a recognition result indicating access denied may be generated. This enables to distinguish inanimate non-human objects, e.g. a trolley that an authorized person trails behind him, from a person trying to utilize tailgating to pass through the passage device 110 after an authorized person.

Figure 5:
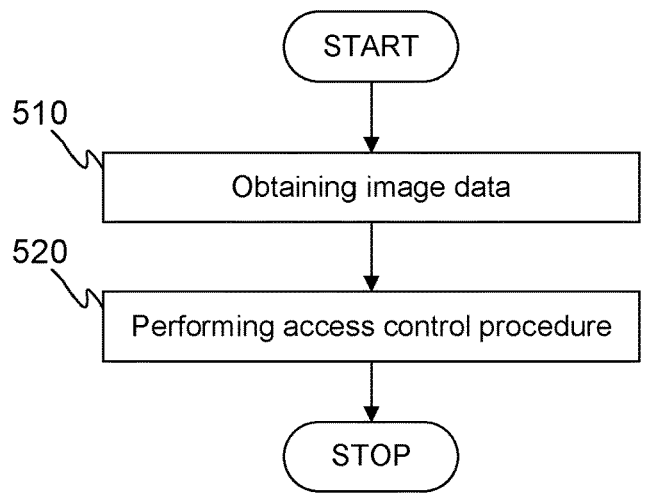
FIG. 5 illustrates schematically an example of a method according to the invention.

Above the invention is described relating to the access control system for a passage device. Next an example of a method for access control of a passage device according to the invention is described by referring to FIG. 5. FIG. 5 schematically illustrates the invention as a flow chart. The method comprises obtaining 510 a first image data from the first imaging device 120a having a first field of view 140a to an entrance area 150 of the passage device 110, and/or obtaining 510 a second image data from a second imaging device 120b having a second field of view 140b to the entrance area 150 of the passage device 110. The first imaging device 120a is arranged to the passage device 110 or in a vicinity of the passage device 110 and the second imaging device 120b is arranged to the passage device 110 or in a vicinity of the passage device 110, so that the second field of view 140b differs at least partly from the first field of view 140a as discussed above. The method further comprises performing 520 an access control procedure for the obtained first image data and/or the obtained second image data. The step 520 will be described next more in detail by referring to FIG. 6.

According to an example embodiment of the invention, the first imaging device 120a and the second imaging device 120b may provide the first image data and the second image data for the facial recognition-based access control procedure from different distances from the passage device 110. For example, the first imaging device 120a may provide the first image data from a first distance from the passage device 110 and the second imaging device 120b may provide the second image data from a second distance from the passage device 110, wherein the first distance and the second distance differs from each other.

Figure 6:
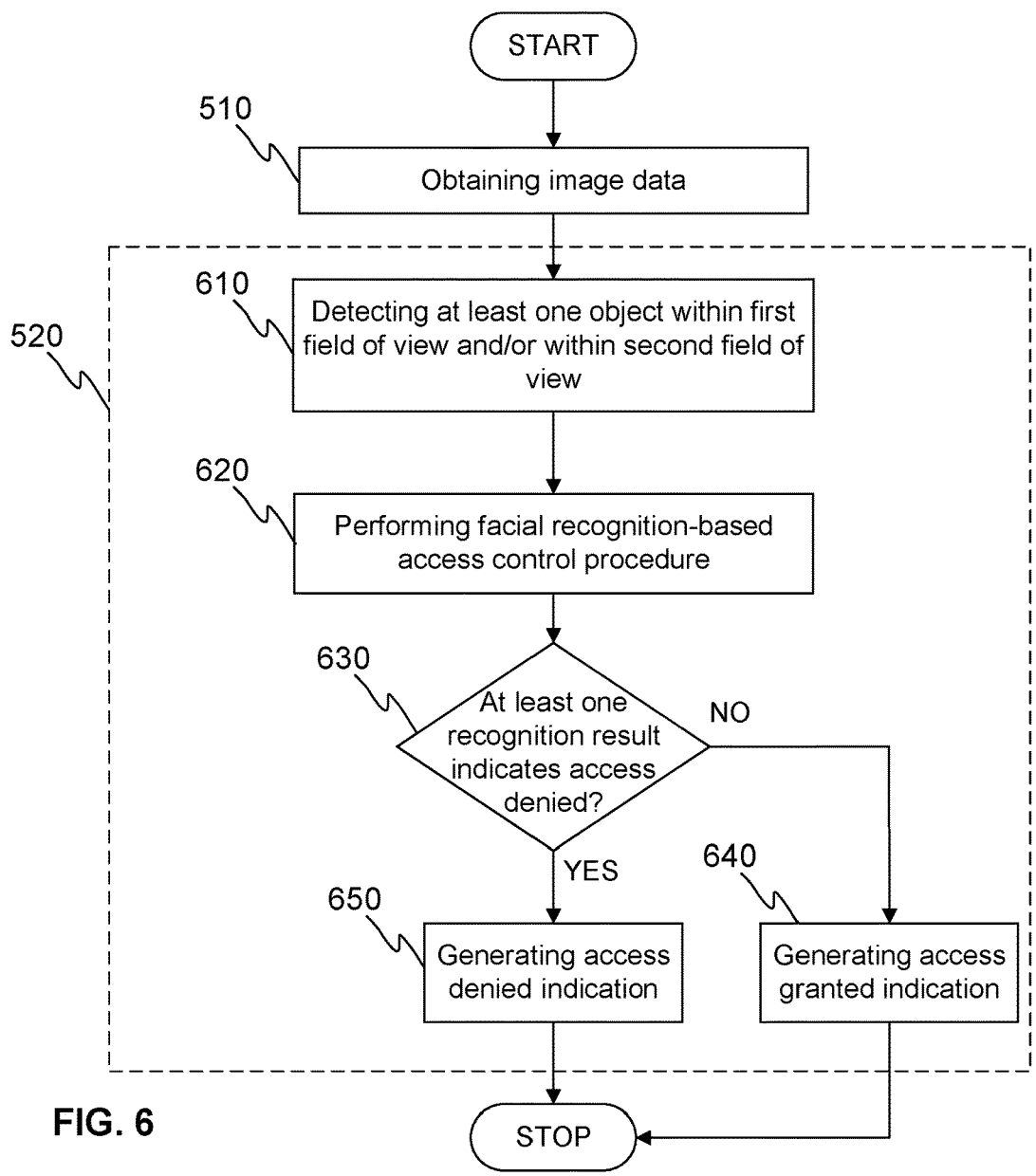
FIG. 6 illustrates schematically another example of a method according to the invention.

According to one example embodiment of the invention illustrated in FIG. 6, the method may comprise detecting 610 at least one object within the first field of view 140a and/or within the second field of view 140b. At the step 620 the facial recognition-based access control procedure may be performed for the first image data in case the at least one object, e.g. at least one person, is detected within the first field of view and/or for the second image data in case the at least one object is detected within the second field of view. Based on the at least one recognition result of the facial recognition-based access control procedure an access control action may be generated at the steps 640, 650. The access control action may comprise an access denied indication at the step 640, if at least one recognition result at the step 630 indicates access denied, otherwise the access control action may comprise an access granted indication at the step 650.

The access denied indication may comprise visual indication, voice indication, closing the barrier device 114 of the passage device 110, and/or sending the image data causing the recognition result indicating access denied to an external security entity. If the barrier device 114 of the passage device 110 is initially open, the access denied indication may comprise closing the barrier device 114 of the passage device 110. Alternatively, if the barrier device 114 of the passage device 110 is initially closed, the access denied indication may comprise maintaining the barrier device 114 of the passage device 110 closed. The access granted indication may comprise visual indication, voice indication, and/or opening the barrier device 114 of the passage device 110. If the barrier device 114 of the passage device 110 is initially closed, the access granted indication may comprise opening the barrier device 114 of the passage device 110. Alternatively, if the barrier device 114 of the passage device 110 is initially open, the access granted indication may comprise maintaining the barrier device 114 of the passage device 110. If the passage device 110 does not have the barrier device 140 access control action comprising visual indications and/or voice indications may be generated. Alternatively or in addition, if the passage device 110 does not have the barrier device 140 the access denied indication may further comprise sending the image data causing the recognition result indicating access denied to the external security entity, such as a remote server, a cloud server, a computing circuit, a network of computing devices. This enables that the unauthorized person may be identified, even though the unauthorized person passed through the passage device 110.

According to an example embodiment of a method according to the invention an object 300, i.e. a person, may be detected at the step 610 within the first field of view 140*a*, but not within the second field of view 140*b*, as in the example access control situation illustrated in FIG. 3. At the step 620 the facial recognition-based access control procedure may be performed for the first image data. If at least one recognition result of the facial recognition-based access control procedure at the step 630 indicates access granted, i.e. the person 300 has an authorization to access the passage device 110, at the step 650 the access control action comprising an access granted indication, e.g. visual indication and/or voice indication may be generated. As the barrier device 114 of the passage device 110 is initially open in this example, the barrier device 114 is maintained open in response to the access granted indication. Alternatively, if at least one recognition result of the facial recognition-based access control procedure indicates access denied, i.e. the person 300 does not have an authorization to access the passage device 110, the access control action comprising an access denied indication comprising visual indication, voice indication, closing the barrier device 114 of the passage device 110, and/or sending the image data causing the recognition result indicating access denied to the external security entity, may be generated.

According to an example embodiment of a method according to the invention, a first object, i.e. a first person, 300*a* is detected at the step 610 within the first field of view 140*a* and a second object, i.e. a second person, 300*b* is detected at the step 610 within the second field of view 140*b*, as in the example access control situation illustrated in FIG. 4A. At the step 620 the facial recognition-based access control procedure may be performed for the first image data and for the second image data. If the first person 300*a* and the second person 300*b* both have authorizations to access the passage device 110, the recognition results of the facial recognition-based access control procedure of the first image data and the second image data at the step 630 indicates access granted and thus the method may comprise at the step 640 generating the access control action comprising an access granted indication, e.g. visual indication and/or voice indication and opening the passage device to allow both the first person 300*a* and the second person 300*b* to pass through the passage device 110. But for example, if the person 300*a* has an authorization to access the passage device 110, but the person 300*b* does not have an authorization to access the passage device 110, i.e. the second person 300*b* is trying to utilize tailgating to pass through the passage device 110 after the authorized first person 400*a,* the recognition result of the facial recognition-based access control procedure of the first image data at the step 630 indicates access grated and the recognition result of the facial recognition-based access control procedure of the second image data at the step 630 indicates access denied, the method comprises at the step 650 generating the access control action comprising an access denied indication comprising visual indication, voice indication, and/or sending the image data causing the recognition result indicating access denied to the external security entity. As the barrier device 114 of the passage device 110 is initially close in this example, the barrier device 114 is maintained closed in response to the access denied indication in order to prevent the access of the unauthorized second person 300*b* and also the authorized first person 300*a*. Thus, the access control method according to the invention obtaining image data from two imaging devices 120*a*, 120*b* having at least partly differing field of views 120*a*, 120*b* enables more efficient prevention of tailgating. If only the first imaging device 120*b* would be used, the tailgating as shown in the example access control situation of FIG. 4A could not be prevented, because the unauthorized second person would not be detected with the first imaging device 120*a*.

Alternatively, according to another example embodiment of a method according to the invention, an object, i.e. a person, 300 is detected at the step 610 within the first field of view 140*a* and within the second field of view 140*b*, i.e. the same object 300 is detected within the both field of views as in the example access control situation illustrated in FIG. 4B. At the step 620 the facial recognition-based access control procedure may be performed for the first image data and for the second image data. If the person 300 has an authorization to access the passage device 110, the recognition results of the facial recognition-based access control procedure of the first image data and the second image data at the step 630 both indicate access granted and thus the method may comprise at the step 640 generating the access control action comprising an access granted indication, e.g. visual indication and/or voice indication. As the barrier device 114 of the passage device is initially open, the barrier device 114 is maintained open in response to access granted indication to allow the person 300 to pass the passage device 110. Alternatively, if the person 300 does not have an authorization to access the passage device 110, the recognition results of the facial recognition-based access control procedure of the first image data and the second image data at the step 630 both indicate access denied, the method may comprise at the step 650 generating the access control action comprising an access denied indication comprising visual indication, voice indication, and/or sending the image data causing the recognition result indicating access denied to the external security entity; and closing the barrier device 114 of the passage device 110 in order to prevent the access of the unauthorized person 300. Thus, the access control method according to the invention obtaining image data from two imaging devices 120a, 120b having at least partly differing field of views 120a, 120b improves at least partly the reliability of the facial recognition-based access control. Alternatively or in addition, the second imaging device 120b may be used to verify the facial recognition-based access control performed with the first imaging device 120b. In the example access control situation of FIG. 4B, wherein the same object 300 is detected within the first field of view 140a and within the second field of view 140b, if the recognition results of the facial recognition-based access control procedure of the first image data and the second image data at the step 630 contradict with each other, i.e. one of the recognition results indicates access granted and the other one of the recognition results indicates access denied, the access control action comprising an access denied indication may be generated. The contradicting recognition results may indicate a defect in the facial recognition-based access control procedure, in one of the imaging devices 120a, 120b, and/or in the obtained image data.

Figure 7:
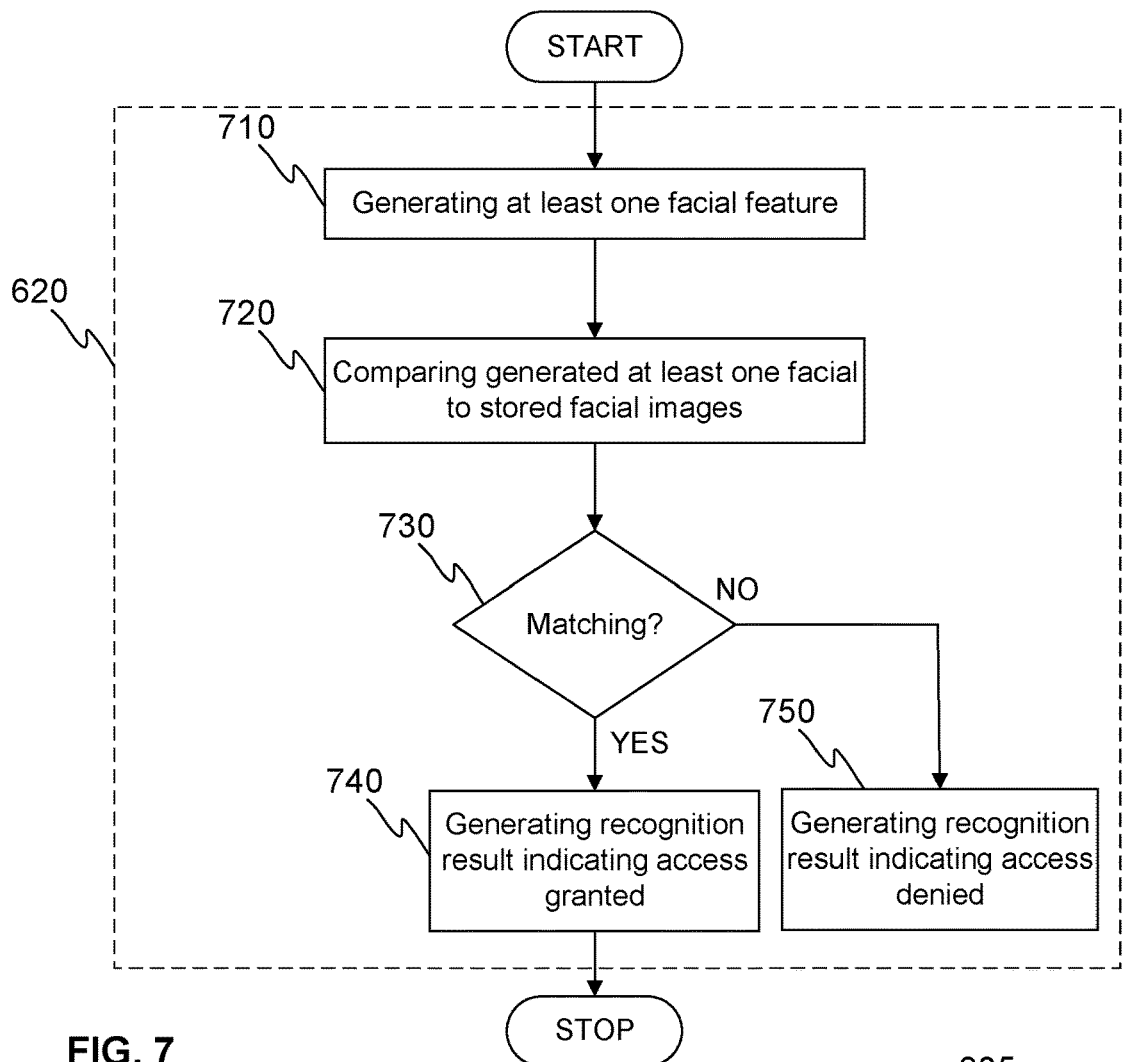
FIG. 7 illustrates schematically an example of a facial recognition-based access control procedure according to the invention.

The facial recognition-based access control procedure used in the different embodiments of the invention may be based on any known facial recognition-based access control procedures, e.g. algorithm-based 2D recognition, 3D recognition, skin texture analysis, or a combination of one or more of these procedures. The facial recognition-based access control procedure may comprise at least the following steps: face detection, feature extraction, and/or identification. The facial recognition-based access control procedure may be performed for each obtained image data to identify one or more objects, i.e. persons, from the obtained image data and to verify whether the one or more persons have authorization to access the passage device. The obtained image data may comprise a captured image from a still image or a video image. Next a simple example of some basic steps of the facial recognition-based access control procedure are described referring to FIG. 7, wherein an example method steps of the facial recognition-based access control procedure 620 are illustrated. First at the face detection step from the obtained image data a face of each at least one object, i.e. a person, is extracted. The face of the each at least one object may be straight towards the imaging device 120a, 120b or the side profile of the face of the each at least one object may be towards the imaging device 120a, 120b, or anything between these. Next at the feature extraction stage the at least one facial feature of each at least one object may be generated 710. The at least one facial feature may comprise, e.g. relative position, size and/or shape of the eyes, nose, cheekbones, forehead and/or chin; and/or distance between any of these, etc. The generated facial features may be used to distinguish the face of the object from the faces of other objects. At the identification step the generated at least one facial feature of each at least one object may be compared 720 to a plurality of stored facial images. The facial images may be stored into a database. The database may be stored into a memory unit the control unit 130 or it may be an external database. Each of the stored plurality of facial images may represent a person having an authorization to access the passage device 110. In response to that the generated at least one facial feature of each at least one object matches at the step 730 with one of the stored plurality of facial images, a recognition result indicating access granted may be generated 740. Alternatively, in response to that the generated at least one facial feature of at least one of the at least one object does not match at the step 730 with any of the stored plurality of facial images, i.e. the generated at least one facial feature of at least one of the at least one object mismatches with the stored plurality of facial images, a recognition result indicating access denied may be generated 750. The generated at least one facial feature of an object may be defined to match with a stored facial image, if corresponding at least one facial feature of the object may be found from the stored facial image. The generated at least one facial feature of an object may be defined to mismatch with a stored facial image, if at least one of the at least one facial feature of the object is not found from the stored facial image.

According to an example embodiment of the method according to invention, a full facial recognition-based access control procedure e.g. according to the above described basic steps of the facial recognition-based access control procedure 710-750, may be performed for the first image data obtained from the first imaging device 120a to identify one or more objects, i.e. persons, from the obtained first image data and to verify whether the one or more persons have authorization to access the passage device. Further, a simplified facial recognition-based access control procedure may be performed for the second image data obtained from the second imaging device 120b. The simplified facial recognition-based access control procedure may for example comprise only the face detection step to extract one or more human objects from the second image data. In response to not detecting one or more human objects from the second image data, a recognition result indicating access granted may be generated. Alternatively, in response to a detection of one or more human objects from the second image data, a recognition result indicating access denied may be generated. This enables to distinguish inanimate non-human objects, e.g. a trolley that an authorized person trails behind him, from a person trying to utilize tailgating to pass through the passage device 110 after an authorized person.

Figure 8:
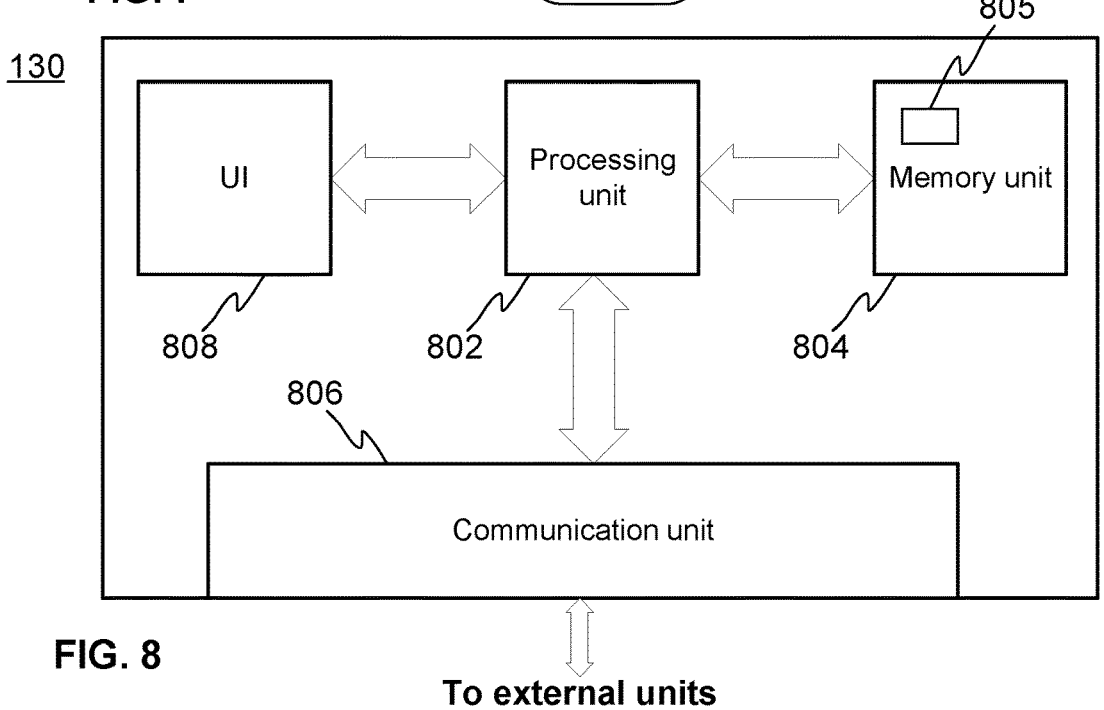
FIG. 8 schematically illustrates an example of a control unit according to the invention.

FIG. 8 schematically illustrates an example of a control unit 130 according to the invention. The control unit 130 may comprise a processing unit 802 comprising one or more processors, a memory unit 804 comprising one or more memories, a communication unit 808 comprising one or more communication devices, and a user interface (UI) 806. The mentioned elements of may be communicatively coupled to each other with e.g. an internal bus. The one or more processors of the processing unit 802 may be any suitable processor for processing information and control the operation of the control unit 130, among other tasks. The memory unit 804 may store portions of computer program code 805 and any other data, and the processing unit 802 may cause the control unit 130 to perform one or more method steps as described by executing at least some portions of the computer program code 805 stored in the memory unit 804. Furthermore, the one or more memories of the memory unit 804 may be volatile or nonvolatile. Moreover, the one or more memories are not limited to a certain type of memory only, but any memory type suitable for storing the described pieces of information may be applied in the context of the invention. The communication unit 808 may be based on at least one known communication technologies, either wired or wireless, in order to exchange pieces of information as described earlier. The communication unit 808 provides an interface for communication with any external unit, such as the first imaging unit 120a, the second imaging unit 120b, a door control unit, database and/or any external systems or units. The user interface 806 may comprise I/O devices, such as buttons, keyboard, touch screen, microphone, loudspeaker, display and so on, for receiving input and outputting information.

The control unit 130 may be an internal computing unit of the passage device 110 or an external control unit. Some non-limiting examples of the external control unit 130 may e.g. be a remote server, a cloud server, a remote access control unit, a computing circuit, a network of computing devices. The external unit herein means a unit that locates separate from the passage device 110. The use of the external control unit as the control unit 130 enables that sufficiently large computational resources may be available compared to a use of an internal control unit. The implementation of the control unit 130 may be done as a stand-alone entity or as a distributed computing environment between a plurality of stand-alone devices, such as a plurality of servers providing distributed computing resource.

The above described access control system and a method for a passage device according to the invention improves the reliability of facial recognition-based access control and/or improves the efficiency of prevention of tailgating, because the access control system according to the invention is more difficult to be cheated. Moreover, the above described access control system and a method enables efficient prevention of tailgating with substantially simple algorithms and reduced processing power. The access control system according to the invention described above may be implemented cost efficient imaging devices and control unit and enables a simple construction of the access control system, which in turn reduces response time of the access control system.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An access control system for a passage device, the system comprising:
a first imaging device arranged to a first frame and having a first field of view to an entrance area of the passage device for providing first image data;
a second imaging device arranged to a second frame and having a second field of view to the entrance area of the passage device for providing second image data;
a barrier connected to the first frame and the second frame; and
a control unit for performing a facial recognition-based access control procedure for the first image data and/or for the second image data,
wherein the first imaging device is arranged to the passage device or in a vicinity of the passage device and the second imaging device is arranged to the passage device or in a vicinity of the passage device so that the second field of view differs at least partly from the first field of view,
wherein the control unit is further configured to:
detect at least one person within the first field of view;
perform the facial recognition-based access control procedure for the first image data;
verify whether the at least one person has authorization to access the passage device;
perform a simplified facial recognition-based access control procedure for the second image data to distinguish non-human objects from human objects after the at least one person having authorization to access the passage device; and
generate a recognition result indicating access denied or access granted if no non-human object after the at least one person having authorization to access the passage device is detected from the second image data provided by the second imaging device.

2. The access control system according to claim 1, wherein the passage device is one of the following: security gate, elevator door, automatic door, building door, turnstile.

3. The access control system according to claim 1, wherein the first imaging device is communicatively coupled to the control unit, wherein the communicatively coupling is based on one of the following technologies: wired and wireless.

4. The access control system according to claim 1, wherein the second imaging device is communicatively coupled to the control unit, wherein the communicatively coupling is based on one of the following technologies: wired and wireless.

5. The access control system according to claim 1, wherein the first imaging device is one of the following: camera, video camera, and the second imaging device is one of the following: camera and video camera.

6. The access control system according to claim 1, wherein the access granted indication comprises: visual indication, voice indication, and/or opening the barrier.

7. The access control system according to claim 1, wherein the facial recognition-based access control procedure comprises:
generating at least one facial feature from the first or second image data;
comparing the generated at least one facial feature to a plurality of stored facial images; and
generating a recognition result indicating access granted, in response to the at least one facial feature matches with one of the stored plurality of facial images, or generating a recognition result indicating access denied, in response to the at least one facial feature does not match to any of the stored plurality of facial images.

8. A method for access control of a passage device, the method comprising:
obtaining first image data from a first imaging device on a first frame and having a first field of view to an entrance area of the passage device; and
obtaining second image data from a second imaging device on a second frame and having a second field of view to the entrance area of the passage device,
wherein the first imaging device is arranged to the passage device or in a vicinity of the passage device and the second imaging device is arranged to the passage device or in a vicinity of the passage device so that the second field of view differs at least partly from the first field of view wherein the method further comprises:
detecting at least one person within the first field of view;
performing a facial recognition-based access control procedure for the first image data;
verifying whether the at least one person has authorization to access the passage device;
performing a simplified facial recognition-based access control procedure for the second image data to distinguish non-human objects from human objects after the at least one person having authorization to access the passage device; and generating a recognition result indicating access denied or access granted if no non-human object after the at least one person having authorization to access the passage device is detected from the second image data provided by the second imaging device.

9. The method according to claim 8, wherein the passage device is one of the following: security gate, elevator door, automatic door frame, building door, turnstile.

10. The method according to claim 8, wherein the first imaging device is communicatively coupled to a control unit, wherein the communicatively coupling is based on one of the following technologies: wired and wireless.

11. The method according to claim 8, wherein the second imaging device is communicatively coupled to a control unit, wherein the communicatively coupling is based on one of the following technologies: wired and wireless.

12. The method according to claim 8, wherein the first imaging device is one of the following: camera, video camera, and the second imaging device is one of the following: camera and video camera.

13. The method according to claim 8, wherein the access granted indication comprises: at least one of visual indication, voice indication, and/or opening the barrier.

14. The method according to claim 8, wherein the facial recognition-based access control procedure comprises:
generating at least one facial feature from the first or second image data;
comparing the generated at least one facial feature to a plurality of stored facial images; and
generating a recognition result indicating access granted, in response to the at least one facial feature matches with one of the stored plurality of facial images, or generating a recognition result indicating access denied, in response to the at least one facial feature does not match with the stored plurality of facial images.

15. The access control system according to claim 1, wherein a height of the barrier is less than a height of the frame.

16. The access control system according to claim 1, wherein each frame is a post.

* * * * *